United States Patent [19]

Stevison et al.

[11] 4,426,705

[45] Jan. 17, 1984

[54] DOUBLE ELECTRIC DISCHARGE COAXIAL LASER

[75] Inventors: Donald F. Stevison, New Carlisle; Edmund J. Rolinski, Dayton, both of Ohio

[73] Assignee: The United States of America as represented by the Secretary of the Air Force, Washington, D.C.

[21] Appl. No.: 308,975

[22] Filed: Oct. 6, 1981

[51] Int. Cl.³ .............................................. H01S 3/09
[52] U.S. Cl. ..................................... 372/58; 372/93; 372/97; 372/81
[58] Field of Search ...................... 372/99, 93, 87, 88, 372/81, 58, 97

[56] References Cited

U.S. PATENT DOCUMENTS

| 3,704,428 | 11/1972 | Barry et al. | 372/58 |
| 3,818,375 | 6/1974 | Stapleton et al. | 331/94.5 |
| 3,931,589 | 1/1976 | Aisenberg et al. | 331/94.5 |
| 4,287,487 | 9/1981 | Kuwabara et al. | 372/86 |
| 4,351,052 | 9/1982 | Sasaki et al. | 372/99 |

Primary Examiner—James W. Davie
Attorney, Agent, or Firm—Donald J. Singer; Bobby D. Scearce

[57] ABSTRACT

A novel electrical discharge gas laser device is provided which comprises a pair of laser discharge cavity portions optically interconnected within a U-shaped optical resonant cavity, the laser cavity portions configured to intercommunicate and share a common power supply.

3 Claims, 1 Drawing Figure

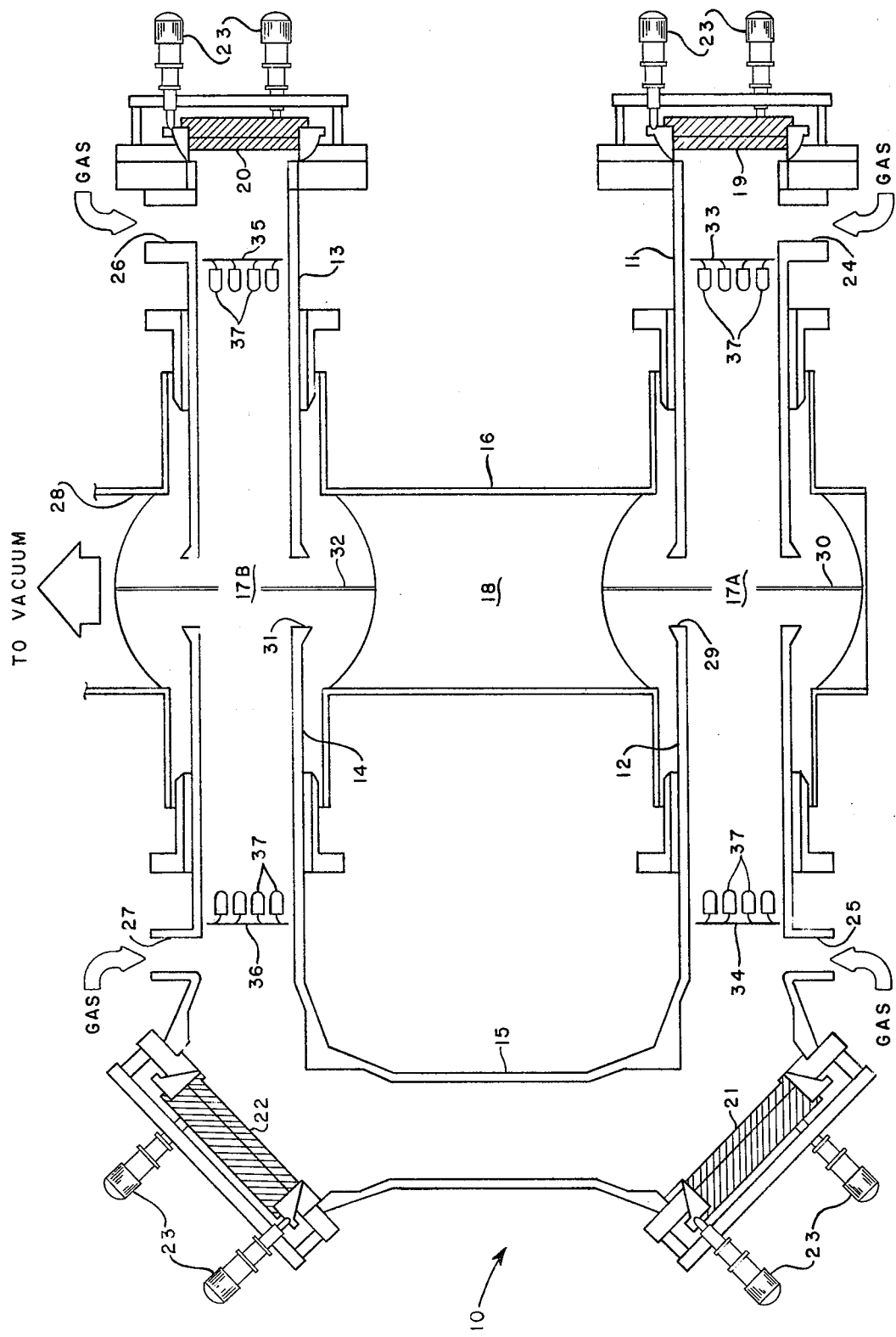

DOUBLE ELECTRIC DISCHARGE COAXIAL LASER

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of gas laser systems, and more particularly to improvements in electric discharge flowing gas lasers.

With the development of the high energy laser, significant military, research and industrial applications of this laser have become apparent. Extensive research and development on electrical discharge, flowing gas lasers, and particularly $CO_2$ lasers, has been undertaken to investigate the effects of lasers on materials, and to improve the power output capability and operational efficiency of the high energy gaseous laser. For weapon systems, and especially for airborne applications thereof, operational efficiency, power output and bulkiness of high energy laser systems are premier considerations. Therefore, efforts have been directed toward improving the performance of the laser such as by increasing the efficiency of the pumping mechanism within the laser cavity, increasing the amount of laser medium subject to the discharge, increasing the input power, and improving the geometry of the laser system.

The invention herein described represents a significant improvement in electrical discharge flowing gas lasers, and, in particular, provides a novel laser cavity configuration to optimize the performance of an electrical discharge coaxial $CO_2$ laser used for the evaluation of laser effects on materials. The novel cavity configuration of this invention may significantly increase the power output of a gas laser without beam distortion, and comprises an optical resonant cavity having a U-shape and having two laser cavity portions, optically interconnected, and configured to intercommunicate, which significantly enhances pumping within each cavity portion and increases the volume of gaseous laser medium subject to discharge. The power supply thus provides power to each cavity portion with increased efficiency, resulting in significantly increased laser power output, and substantially reduces the space needed to contain the laser device compared to that required for a straight configuration of comparable power.

It is, therefore, an object of this invention to provide an improved laser device.

It is a further object of this invention to provide an improved laser device configuration exhibiting significant increase in efficiency, and power output.

It is a further object of this invention to provide a flowing gas laser having substantially improved efficiency with diminished space requirements.

These and other objects of the present invention, as would occur to one with skill in the field of this invention, will become apparent as the detailed description thereof proceeds.

SUMMARY OF THE INVENTION

In accordance with the foregoing principles and objects of the present invention, a novel electrical discharge gas laser device is provided which comprises a pair of laser discharge cavity portions optically interconnected with a U-shaped optical resonant cavity, the laser cavity portions configured to intercommunicate and share a common power supply.

DESCRIPTION OF THE DRAWINGS

The invention will be more clearly understood from the following detailed description of a specific embodiment thereof read in conjunction with the accompanying drawing which is a schematic plan view of a representative embodiment of the novel laser device of this invention.

DETAILED DESCRIPTION

Referring now to the drawing, a schematic plan view of the novel laser device of the present invention is shown therein and comprises a generally tubular laser device configuration defining two separate laser discharge cavity portions or legs optically interconnected to each other within a U-shaped optical resonant cavity. The laser device 10, as shown in the drawing, may therefore comprise legs 11 and 12 as one section of the optical resonant cavity of laser 10, and legs 13 and 14 as the other section of the resonant cavity of laser 10, the legs 11, 12, 13 and 14 being optically interconnected by way of a communicating cavity portion or passageway 15 to complete the U shape of the optical resonant cavity and lasing axis of laser device 10. Cavity leg sections 11, 12, 13, 14 and passageway 15 may be conveniently made of pyrex glass, however, the materials comprising the cavity sections are not limiting hereof. Legs 11 and 12 are received coaxially by one side of a double stainless steel tee section 16, and, likewise, legs 13 and 14 are coaxially received thereby. Lasing cavity portion 17a is therefore defined within tee section 16 and legs 11 and 12, and lasing cavity portion 17b is defined within tee section 16 and legs 13 and 14. Lasing cavity portions 17a and 17b are open to each other by way of chamber 18 defined by double tee section 16.

The optical resonant cavity of laser device 10 may be defined between mirror 19, for optically terminating the optical resonant cavity at one end in leg 11, and laser output coupler 20 at the other end of the resonant cavity, for discharging the laser beam generated in laser device 10. Flat, substantially totally reflective mirrors 21 and 22 are suitably mounted at the junctures of leg 12 with passageway 15 and of leg 14 with passageway 15, respectively, to optically fold the lasing axis of laser device 10 and to define the U shape of the optical resonant cavity within laser device 10. All mirrors 19, 21 and 22 and the output coupler 20 may have multiple (3 to 4) point adjustment means, such as micrometer thimbles 23, to suitably align the lasing axis of laser device 10. The mirror 19 terminating the optical resonant cavity at the extremity of leg 11 may optimally comprise a concave, substantially totally reflecting, mirror having a focal length of about 18 meters.

Output coupler 20 may comprise a coated ZnSe optical flat, eutectics of potassium chloride, sodium chloride, and rubidium chloride, germanium or other suitable laser output coupler. Typically, output coupler 20 may be coated on its outer surface with an anti-reflection coating having a reflectivity of about 0.1%; on the inner (cavity) side of the output coupler, it may exhibit a reflectivity of about 75%. The total absorption coefficient of the output coupler 20 should be of the order of 1% or less. Using this type of output coupler, given an operating level of about 30 KW for the laser device 10, about 160 kilojoules may be extracted, and an irradiation time of over five seconds may be allowed. Conventional devices would allow approximately one to two seconds.

The gaseous mixture comprising the laser medium may be throttled into laser device 10 through gas inlets 24, 25, 26 and 27. Typically the constituents of the gaseous medium may be stored under pressure and mixed in a gas system (not shown) and may comprise a suitable mixture of $CO_2$, $N_2$, and He. Gas flow into laser device 10 may be maintained at flow rates typically of 0.1 to about 0.5 lb/sec. consistent with an operating pressure within the cavity of about 50 Torr, and may be mildly preheated prior to insertion into the laser. The gas inlets 24–27 may comprise multiple coaxially disposed ports located substantially as shown in legs 11, 12, 13 and 14. The medium is exhausted from the double tee section 15 of laser 10 through vacuum port 28 to a vacuum system (not shown).

Legs 11 and 13 may comprise moveable sections axially adjustable within the double tee section 16, the axially movement of which controls the length of the optical resonant cavity of laser device 10, the respective individual lengths of each lasing cavity, and the size of the annular aperture 29 near cathode 30 and the annular aperture 31 near cathode 32 through which the gaseous laser medium flows from lasing cavity portions 17a and 17b, respectively. The total pressure within laser 10 may also be adjusted appropriately by moving the legs 11 and 13 within the double tee section 16. In order to optimize performance of laser 10, aperture 29 in lasing cavity portion 17a may be of size different from that of the aperture 31 of lasing cavity 17b in order to properly balance flow through each side of laser 10 of the configuration shown in the drawing, although it is recognized that laser 10 could be configured to provide lasing cavity portions 17a and 17b, and cathode structures 30 and 32 with, respectively, substantially identical structure.

Electrodes for the electric discharge for laser device 10 may be conveniently located within the extremities of each respective leg near gas inlets 24, 25, 26 and 27, as shown in the drawing. Thus, electrode assemblies 33 and 34 may be mounted within legs 11 and 12, respectively, near gas inlets 24 and 25, and electrode assemblies 35 and 36 may be mounted within legs 13 and 14, respectively, near gas inlets 26 and 27 substantially as shown in the drawing. Each of the electrode assemblies 33, 34, 35 and 36 may comprise an annular array of (sixteen or more) individual anodes 37, the annular arrays being disposed coaxially with the mirror mounts and the optical resonant cavity of laser device 10. The electrode assemblies 33, 34, 35 and 36 are each maintained at suitable electric discharge potential. The cathodes 30 and 32 typically are maintained at ground potential. One power supply (not shown in the drawing) may provide approximately 25 KV at about 4.5 amps to each leg of the device to generate discharges between cathode 30 and electrode assemblies 33 and 34, and between cathode 32 and electrode assemblies 35 and 36.

In operation, the gaseous laser medium is inserted into laser device 10 at the inlet ports 24, 25, 26 and 27. Vacuum is maintained on each of the lasing cavity portions 17a and 17b, and a suitable discharge is maintained between the anode assemblies and cathode in each side of laser device 10. The laser beam thus produced within the optical resonant cavity defined by mirrors 19, 21, 22 and output coupler 20 is thus pumped within both lasing cavities 17a and 17b. Disposing lasing cavity portions 17a and 17b in close proximity to each other and allowing them to freely communicate with each other through chamber 18 enhances the laser pumping mechanism within the gaseous laser medium in each lasing cavity with a high degree of synergism, as well as increases the total volume of laser medium subject to the discharge.

The novel laser device as described herein is, therefore, capable of increasing significantly the power output of such an existing electric discharge coaxial laser. Limited only by the capabilities of the component parts, the laser power output may be increased as much as approximately 80%, by taking advantage of the unique geometry of the device to increase the amount of gas in the laser cavity which is under discharge. Therefore, using the same power supply to generate the discharge in the present invention, as compared to that which may be used for conventional straight laser configurations, a significant increase in efficiency is realized.

It is recognized that, although the foregoing description is centered around an improved laser device of the $CO_2$ electric discharge type, the novel configuration of this invention may be adapted to lasers of other types. It is, therefore, understood that the embodiment described herein is not all inclusive of the variations that might occur to one with skill in the field of this invention. Other embodiments are contemplated hereunder and may be developed without departing from the spirit of this invention or from the scope of the appended claims.

We claim:
1. An electric discharge coaxial gas laser device, comprising:
   a. a generally U-shaped laser discharge tube defining a pair of juxtaposed laser discharge cavities;
   b. means defining a generally U-shaped optical resonant cavity and lasing axis within said discharge tube and coaxial with said discharge cavities;
   c. means for supplying gaseous laser medium to each said laser discharge cavity;
   d. means for exhausting said medium from each said laser discharge cavity;
   e. means for sustaining a laser discharge in each said laser discharge cavity; and
   f. means defining a chamber through which said laser discharge cavities intercommunicate near their respective centers, whereby the volume of said laser medium subject to discharge is substantially increased resulting in mutual reinforcement of the said laser discharges.

2. The gas laser device as recited in claim 1 wherein said means for supplying gaseous laser medium comprises a plurality of inlet ports annularly disposed around said resonant cavity near each end of each said juxtaposed laser discharge cavity, and said means for exhausting said medium is operatively connected to said chamber.

3. The gas laser device as recited in claim 1 wherein said means defining a generally U-shaped optical resonant cavity comprises a laser mirror at one end of said discharge tube, a laser output coupler at the other end of said discharge tube, and a pair of laser mirrors for optically folding said optical resonant cavity to said U shape.

* * * * *